United States Patent [19]

Schopper et al.

[11] 4,422,694

[45] Dec. 27, 1983

[54] BRAKING PRESSURE CONTROL UNIT FOR A HYDRAULIC BRAKE SYSTEM

[75] Inventors: Bernd Schopper; Volker Berisch, both of Hattersheim, Fed. Rep. of Germany

[73] Assignee: ITT Industries, Inc., New York, N.Y.

[21] Appl. No.: 455,448

[22] Filed: Jan. 4, 1983

Related U.S. Application Data

[63] Continuation of Ser. No. 244,999, Mar. 18, 1981, abandoned.

[30] Foreign Application Priority Data

Apr. 26, 1980 [DE] Fed. Rep. of Germany ....... 3016207

[51] Int. Cl.³ .............................................. B60T 11/32
[52] U.S. Cl. ................................................ 303/84 A
[58] Field of Search ............... 188/349; 303/6 C, 6 R, 303/84 A, 84 R

[56] References Cited

U.S. PATENT DOCUMENTS 4,311,345 1/1982 Schopper .......................... 303/84 A Primary Examiner—Duane A. Reger
Attorney, Agent, or Firm—James B. Raden; Marvin M. Chaban

[57] ABSTRACT

Problems exist in known braking pressure control units for brake systems in which the rear wheels of a vehicle are assigned to different brake circuits. These problems include unequal outlet pressure to the two brake circuits due to manufacturing tolerances and that upon failure of one brake circuit the control function of the intact brake circuit still remains operative. According to the present invention these problems are eliminated by having two differential pistons bear against each other via a common spring device and to provide an arrangement by which upon failure of one brake circuit, the valve of the intact brake circuit will be moved into or kept in an open position.

34 Claims, 3 Drawing Figures

BRAKING PRESSURE CONTROL UNIT FOR A HYDRAULIC BRAKE SYSTEM

CROSS-REFERENCE TO RELATED APPLICATION

This is a continuation of application Ser. No. 244,999, filed Mar. 18, 1981, now abandoned.

BACKGROUND OF THE INVENTION

The present invention relates to a braking pressure control unit for a hydraulic brake system, in which the brakes at the wheels of one axle are acted upon by two separate brake circuits comprising a casing with an intermediate piston arranged therein, the intermediate piston being movable from its normal position in both directions relative to the casing, two differential pistons slidable in the casing against a preloading force in opposite directions, and two valve devices by which a pressure input chamber is connectible to a pressure output chamber, with one of the two differential pistons forming one part and the intermediate piston the other part of each of the two valve devices.

A braking pressure control unit of this type is known from British Pat. No. 1,475,635. In this arrangement, each control portion of the intermediate piston bears against a casing projection via a spring system of its own. Conditioned by the differences in pressure of the two brake circuits always occurring in a tandem master cylinder and the tolerances of the springs acting upon the control portions of the intermediate piston considerable discrepancies of the outlet pressures of the braking pressure control unit may be the consequence. Another disadvantage of the known device is that upon failure of a brake circuit, the control function of the other brake circuit is maintained unaffected. It is, however, desired when a brake circuit fails to obtain a maximum high braking effect with the still operable brake circuit.

SUMMARY OF THE INVENTION

It is, therefore, an object of the present invention to provide a braking pressure control unit of the type referred to hereinabove, in which the outlet pressures of the two brake circuits are exactly equal after the pressure decrease has started even in the case of different amounts of the inlet pressures and in which a higher pressure is introduced upon failure of one brake circuit.

A feature of the present invention is the provision of a braking pressure control unit for a hydraulic brake system having brakes at the wheels of one axle connected to two different brake circuits comprising a casing having a intermediate piston disposed therein coaxial of a longitudinal axis, the piston being movable from its rest position in both directions relative to the casing; two differential pistons disposed coaxial of the axis in tandem relationship in the casing and slidable in the casing against a preloading force in opposite directions, the two differential pistons being preloaded and bearing against one another by means of a common spring device; a valve device associated with each of the differential pistons and the intermediate piston, each of the valve devices connecting a pressure inlet chamber of an associated one of the brake circuits to a pressure outlet chamber of the associated one of the brake circuits; and means associated with each of the differential pistons and the intermediate piston, which upon failure of one of the brake circuits, ensures that the valve device of the intact brake circuit is in its open position.

In accordance with a preferred embodiment, when the other brake circuit fails, the open position of a valve is achieved by the maximum displacement travel o the differential pistons being greater than the valve closure travel and smaller than the sum of valve closure travel and displacement travel of the intermediate piston upon failure of a brake circuit. it is expedient for reasons of ease of manufacture and assembly to have the intermediate piston be of a two-part or multiple-part construction. The spring device may include one single helical spring, the ends of which bearing directly or by the intermediary of appropriate supporting means against the differential pistons. To limit the displacement travel of the intermediate piston, there are stops provided which are adapted to abut either the control portion of the intermediate piston or the casing.

In accordance with the preferred embodiment of the present invention, the differential pistons are constructed as a hollow cylinder with a radially inwardly extending collar at one end thereof, with the ends of the intermediate piston being arranged slidably sealed in the portion of the differential pistons opposite to the collar, with each of the pressure input chambers being defined by the intermediate piston and the inner side of the differential piston and each of the pressure output chambers being defined by the outer side of the differential piston and the casing, and which the spring device being arranged coaxially outside the intermediate piston. In this structure, springs of a relatively large diameter are employed which have the advantage of being easier to govern as to their spring characteristic. For the purpose of ease of manufacture and to avoid staggered axes of the components guided in each other, it is suitable to construct both the casing and the central piston in two parts, with two like piston portions and two like casing portions being created by the disconnecting point. The disconnecting point forming an axis of symmetry of the braking pressure control unit obviates the need for more different components than for a single-circuit control unit.

To the end that the intermediate piston is always moved to its normal position when the device is depressurized, it is expedient to have the spring device comprise two springs and the intermediate piston include a collar, with the springs bearing against one differential piston and the collar, respectively. A ring fastened to the casing provides stops to limit the maximum displacement travel of the differential pistons. To obviate the necessity for separate check valves for the pressure decrease, it is suitable that the closure members of the valves are located at the end faces of the intermediate piston and that each of the closure members are biased against a stop by one spring which bears against the end face of the intermediate piston. For achieving a defined closure travel of the valves which is not impaired by the manufacturing tolerances, the valve closure member preferably includes a conical valve, adapted to bear against the casing's end face by means of a tappet, the conical valve being arranged in a sleeve fastened to the intermediate piston, with radially inwardly extending projections serving as a stop for the sleeve.

According to a further embodiment of the present invention, the differential pistons are at least approximately of T-shaped construction and the intermediate piston has basically the form of a hollow cylinder, with the smaller piston steps of the differential pistons being guided in the intermediate piston and with the spring device acting upon the differential pistons being inserted within the intermediate piston. In such a structure, a particularly simple arrangement of the valve is provided in that a sealing cup with a sealing lip abutting the bore's wall is procured for the larger piston step of the differential pistons at their sides close to the intermediate piston. To provide for indication of the malfunction of the brake system, it is expedient to have the intermediate piston cooperate with a probe actuating an alarm device.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
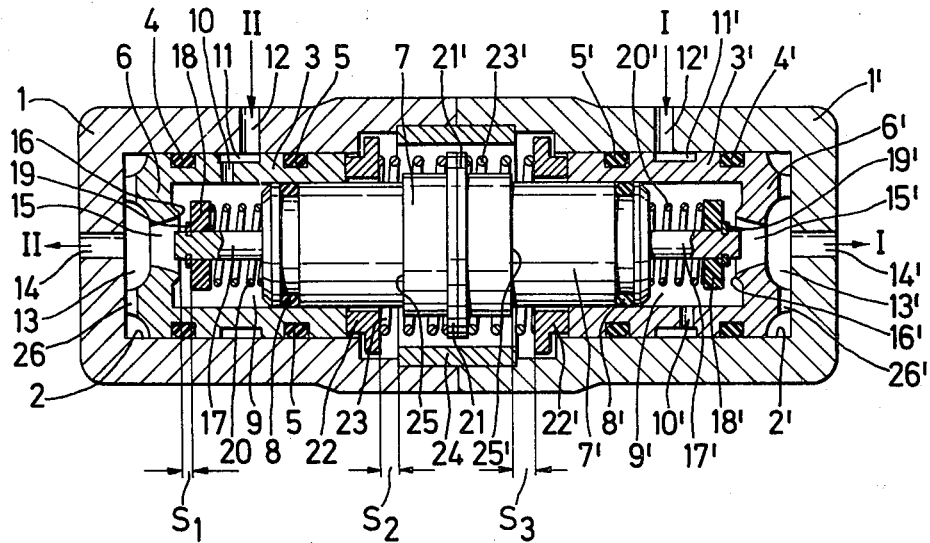
FIG. 1 is a longitudinal cross-sectional view of a first embodiment of a braking pressure control unit in accordance with the principles of the present invention in which the spring device is located coaxially outside the intermediate piston.

The braking pressure control unit shown in FIG. 1 includes a casing 1 including two like casing portions. The braking pressure control unit has an axis of symmetry at the disconnecting point of the casing portions, therefore, for reasons of clarity, only one side will be described, and the reference numerals of both sides will be used.

Disposed in casing 1,1' is a bore 2,2' in which a differential piston 3,3' is housed and sealed by means of seals 4,4' and 5,5'. Differential piston 3,3' is basically formed like a hollow cylinder having a radially inwardly extending collar 6,6' at its end adjacent the casing end wall. An intermediate piston 7,7' is guided in the other end of the hollow-cylindrical differential piston 3,3' and sealed relative to the inner wall of differential piston 3,3' by means of a seal 8,8'. A pressure inlet chamber 9,9' is formed between radial collar 6,6' of differential piston 3,3' and the end face of intermediate piston 7,7'. Inlet chamber 9,9' communicates via a radial bore 10,10' in differential piston 3,3' with an annular chamber 11,11' at the periphery of differential piston 3,3', which in turn receives a fluid port 12,12' connected to a master cylinder (not shown). Annular chamber 11,11' is located between seals 4,4' and 5,5'. The side of radial collar 6,6' adjacent the casing end wall defines a pressure outlet chamber 13,13' connected to a fluid port 14,14' which is connected to a wheel brake cylinder (not shown).

A fluid passageway 15,15' is arranged in the center of radial collar 6,6'. Radial collar 6,6' is formed as an annular valve seat 16,16' on the side thereof close to pressure inlet chamber 9,9'. Arranged at the end face of intermediate piston 7,7' and projecting into pressure inlet chamber 9,9' is a pivot 17,17', on which a ring-shaped valve closure member 18,18' is arranged radially sealingly and axially slidably. Fastened to the free end of pivot 17,17' is a ring 19,19' which serves as a stop for valve closure member 18,18' and against which valve closure member 18,18' is biased by means of a spring 20,20', spring 20,20' bearing against the end face of piston 7,7'. A valve clearance $S_1$ is disposed between valve closure member 18,18' and valve seat 16,16'.

At its portion disposed outside differential piston 3,3', intermediate piston 7,7' has a collar 21,21', at which the two pistons 7,7' abut one another and thereby form a common intermediate piston. Disposed at the end surfaces of differential pistons 3,3', which are adjacent each other, is a ring 22,22'. A control spring 23,23' has one end thereof bearing against an associated one of rings 22,22' and the other end bearing against an associated one of collars 21,21'.

Arranged in a circumferential groove of casing 1,1' is a ring 24 which serves as a stop for rings 22,22'. The distance between ring 24 and rings 22,22' is equal to the maximum displacement travel $S_2$ of differential pistons 3 and 3'. Intermediate piston 7,7' has a shoulder forming a stop 25,25' which is adapted to abut ring 22,22'. The distance $S_3$ between stop 25,25' and ring 22,22' defines the travel of intermediate piston 7,7' upon failure of a brake circuit. Due to the preloading force of control springs 23 and 23', differential pistons 3 and 3' are retained in their end position close to the outlet when the control unit is in its off position abutting the casing's end wall with stops 26,26'. Collar 21,21' is able to be constructed as the actuating organ of a differential pressure alarm device—not illustrated in FIG. 1.

The mode of operation of the regulator according to FIG. 1 will first be described assuming that both brake circuits are operable. When pressure is built up on the inlet side, pressure fluid passes through fluid ports 12 and 12' into annular chambers 11 and 11' and from there through radial bores 10 and 10' into fluid inlet chambers 9 and 9'. Since fluid passageways 15 and 15' are still opened, pressure fluid will pass into pressure outlet chambers 13 and 13' and from there through fluid ports 14 and 14' to the wheel brakes (not shown).

A differential of force will become effective at a specific pressure level due to the differently sized, pressure-subjected surfaces of differential pistons 3 and 3', which will displace differential pistons 3 and 3' against the force of control springs 23 and 23'. This movement of differential pistons 3 and 3' urges valve seats 16 and 16' against valve closure members 18 and 18' causing closure of fluid passageways 15 and 15'. A further pressure increase in the master cylinder—not illustrated in the drawing—has as a result a reduced pressure rise in the wheel brakes corresponding to the ratio of the end surfaces of differential pistons 3 and 3' defining inlet chambers 9 and 9' relative to the surfaces of differential pistons 3 and 3' defining outlet chambers 13 and 13'.

When the pressure on the inlet side is reduced, and since the inlet pressure is lower than the output pressure, valve closure members 18 and 18' will be displaced due to the differential of force caused by the different pressures against springs 20 and 20' and will thus lift from valve seats 16 and 16', so that fluid passageways 15 and 15' are opened again. This balances the pressure between the wheel brake cylinders and the master cylinder again. When the pressure in pressure output chambers 13 and 13' falls below a specific value, control springs 23 and 23' will move differential pistons 3 and 3' into their initial positions.

In case brake circuit II fails because of a defect, with increasing pressure in pressure input chamber 9', intermediate piston 7,7' will displace against control spring 23, until stop 25 abuts ring 22. Differential piston 3' will follow this movement of intermediate piston 7,7', until ring 22' abuts stop 24. Since the maximum displacement travel $S_2$ of differential piston 3' is smaller than the sum of valve closure travel $S_1$ and displacement travel $S_3$ of intermediate piston 7,7', valve beat 16' is not able to abut valve closure member 18'. Therefore, fluid passageway 15' will remain opened. In case circuit I fails instead of brake circuit II, the movement of the pistons will take place analogously in the opposite direction.

Figure 2:
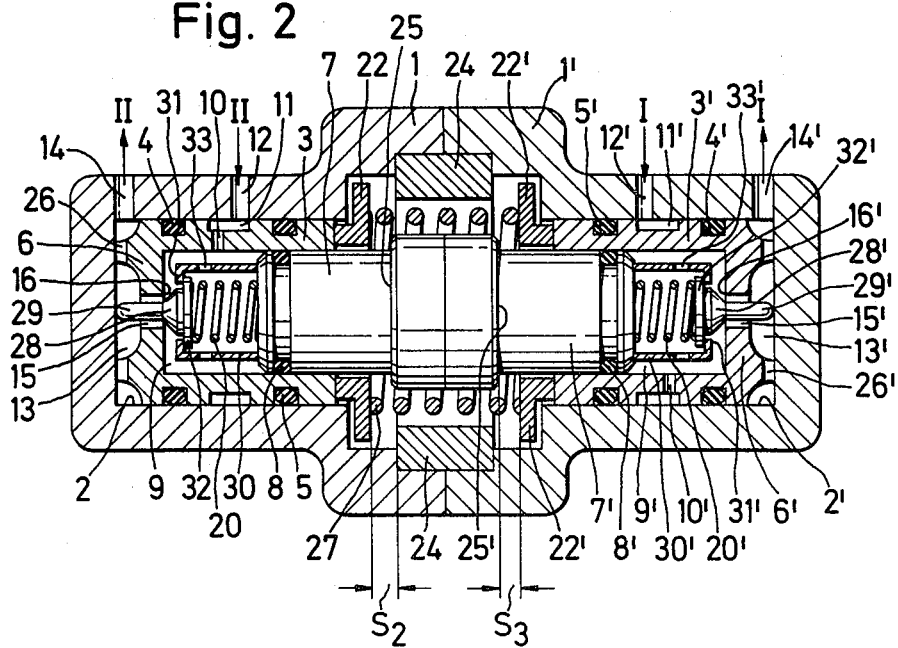
FIG. 2 is a longitudinal cross-sectional view of a second embodiment of a braking pressure control unit in accordance with the principles of the present invention with one single control spring.

The braking pressure control unit illustrated in FIG. 2 corresponds basically with the structure of FIG. 1. To avoid repetitions, only the differences will be dealt with in the following. Like parts have been assigned like reference numerals as in FIG. 1. In contrast to FIG. 1, the spring device is composed of one single control spring 27 bearing against rings 22 and 22'. Intermediate piston 7,7' is not acted upon by control spring 27. Provided as valve closure members are conical valves 28,28' which bear against the end face of the casing by means of a tappet 29,29'. Conical valves 28,28' are each disposed in a sleeve 30,30' fastened to intermediate piston 7,7', sleeves 30 and 30' including radially inwardly extending projections 31,31' which engage over a collar 32,32' of conical valves 28,28'. Openings 33,33' are provided to connect the interior of sleeve 30,30' to pressure inlet chamber 9,9'. The mode of operation of the braking pressure control unit of FIG. 2 corresponds to the one described with respect to FIG. 1.

Figure 3:
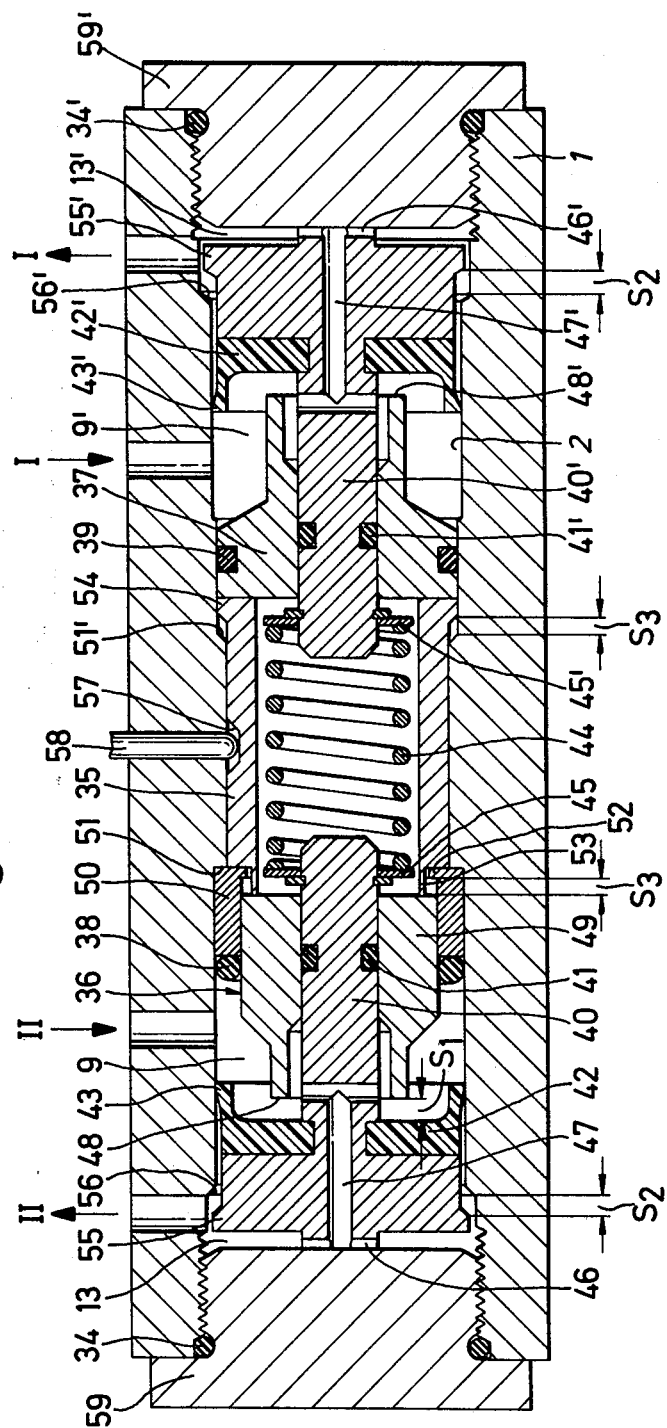
FIG. 3 is a longitudinal cross-sectional view of a third embodiment of a braking pressure control unit in accordance with the principles of the present invention in which the control spring is located coaxially inside the intermediate piston.

The braking pressure control unit illustrated in FIG. 3 includes a casing 1 with a bore 2 which is closed on both casing ends by means of screws 59,59' and seals 34,34'. Arranged inside bore 2 is a multiple-parc intermediate piston 35 of a hollow-cylindrical construction, whose end portions 36 and 37 are annular pistons which are sealed relative to casing 1 by means of seals 38 and 39.

The smaller piston steps of the essentially T-shaped differential pistons 40,40' are each guided in end portions 36 and 37 and sealed relative thereto by means of seals 41,41'. On the side close to end portions 36 and 37, the larger steps of differential pistons 40,40' have cup seals 42,42' whose radially outwardly disposed sealing lips 43,43' move into abutment with the wall of bore 2. Differential pistons 40,40' accommodate fluid channels 47,47', each of which connect one pressure inlet chamber 9,9' with one pressure outlet chamber 13,13'.

Arranged in the hollow space of intermediate piston 35 is a control spring 444 which acts by the intermediary of prop rings 45,45' on differential pistons 40,40' and biases these pistons in the direction of screws 59,59' causing them to abut with screws 59,59' by means of stops 46 and 46'. On the ends defining outlet chambers 13,13' differential pistons 40,40' each include a radially outwardly extending collar 55,55', which define the maximum displacement travel $S_2$ of differential pistons 40,40' in cooperation with stops 56,56'.

The end portions 36 and 37 are constructed as valve seat 48,48' on their ends close to the cup seals 42,42'. The distance between valve seats 48,48' and cup seals 42,42' determines the valve closure travel $S_1$. End portion 36 is of two-part construction and includes an inner annular piston 49 and an outer sleeve 50. Outer sleeve 50 abuts a stop 51 of casing 1 on the end remote from inlet chamber 9, and sleeve 50 forms on its part a stop surface for the middle portion of piston 35. A radially inwardly extending collar 52 of sleeve 50 serves to define the displacement travel of annular piston 49 upon failure of the first brake circuit I, with the distance between collar 52 and annular piston 49 defining displacement travel $S_3$.

The middle portion of piston 35 has an extension 53 penetrating within collar 52 and constantly abutting annular piston 49. Moreover, intermediate piston 35 has on its end adjacent end portion 37 a radially outwardly extending collar 54, which defines the maximum displacement travel $S_3$ of intermediate piston 35 in cooperation with a stop 51'. Disposed at the periphery of intermediate piston 35 is a groove 57. A probe 58 engages groove 57 for actuation of a differential pressure alarm device—not illustrated in the drawing.

The mode of operation of the regulator according to FIG. 3 will first be described assuming that both brake circuits are operable. When pressure is built up on the inlet side, this pressure propagates through the opened valves and fluid channels 47,47' into pressure outlet chambers 13,13' and from there to the wheel brake cylinders.

A differential of force will become effective at a specific pressure level due to the differently sized, pressure-subjected surfaces of differential pistons 40 and 40', which displaces the differential pistons against the force of control spring 44. This movement of differential pistons 40 and 40' urges cup seals 42 and 42' in abutment with valve seats 48 and 48' causing closure of fluid channels 47 and 47'. A further pressure increase on the inlet side has as a result a reduced pressure rise in the wheel brakes corresponding to the ratio of the end surfaces of differential pistons 40 and 40' defining inlet chambers 9 and 9' relative to the surfaces of differential pistons 40 and 40' defining outlet chambers 13 and 13'.

When the pressure on the inlet side is reduced, and, since the inlet pressure is lower than the output pressure, sealing lips 43 and 43' will be lifted from the bore wall, and there will occur a pressure balance. When the pressure in pressure outlet chambers 13 and 13' falls below a specific value, control spring 44 will move differential pistons 40 and 40' into their initial position.

In case brake circuit I fails because of a defect, intermediate piston 35 will first displace in direction of pressure inlet chamber 9' of brake circuit I, with sleeve 50 being held at stop 51. Because of the movement of the components 35,37 and 49, annular piston 49—after having overcome displacement travel $S_3$—will abut collar 52 and will be held there. The displacement of piston 35 by the distance $S_3$ is sufficient to actuate probe 58. Since the sum of the valve closure travel $S_1$ and the maximum displacement travel $S_3$ of intermediate piston 35 is greater than the maximum displacement travel $S_2$ of differential piston 40, the valve remains open and the pressure is transmitted without limits to the wheel brake cylinders. Whereas, if brake circuit II fails and brake circuit I is intact, the movement of the pistons will take place analogously in the opposite direction.

While we have described above the principles of our invention in connection with specific apparatus, it is to be clearly understood that this description is made only by way of example and not as a limitation to the scope of our invention as set forth in the objects thereof and in the accompanying claims.

We claim:

1. A braking pressure control unit for a hydraulic brake system having brakes at the wheels of one axle connected to two different brake circuits comprising:
a casing having an intermediate piston disposed therein coaxial of a longitudinal axis, said piston being movable from its rest position in both directions relative to said casing;
two differential pistons disposed coaxial of said axis in tandem relationship in said casing and slidable in said casing against a preloading force in opposite directions, said two differential pistons being preloaded and bearing against one another by means of a common spring device;
a valve device having a valve seat and a valve closure member associated with each of said differential pistons and said intermediate piston, each of said valve devices having one of said valve seat and said valve closure member coupled to a different one of said differential pistons and the other of said valve seat and said valve closure member coupled to an adjacent end of said intermediate piston, each of said valve devices connecting a pressure inlet chamber of an associated one of said brake circuits to a pressure outlet chamber of said associated one of said brake circuits; and
means associated with each of said differential pistons and said intermediate piston, which upon failure of one of said brake circuits, ensures that said valve device of the intact brake circuit is in its open position.

2. A control unit according to claim 1, wherein said differential pistons, said intermediate piston and said valve devices are disposed relative to each other such that a maximum displacement travel of said differential pistons is greater than a valve closure travel of said valve devices and smaller than the sum of said valve closure travel and a displacement travel of said intermediate piston upon failure of one of said brake circuits.

3. A control unit according to claim 2, wherein said displacement travel of said intermediate piston is defined by a pair of stops formed on said intermediate piston, said pair of stops abutting a selected one of said casing and said differential pistons.

4. A control unit according to claims 1, 2 or 3, wherein
said intermediate piston is constructed of a plurality of parts.

5. A control unit according to claim 4, wherein said spring device includes one helical spring having the ends thereof acting on adjacent ends of said two differential pistons.

6. A control unit according to claim 5, wherein the ends of said helical spring bear directly on said adjacent ends of said two differential pistons.

7. A control unit according to claim 5, wherein the ends of said helical spring bear through intermediary supporting means on said adjacent ends of said two differential pistons.

8. A control unit according to claim 4, wherein each of said two differential pistons is a hollow cylinder having a radially inwardly extending collar on one end thereof, said collar of each of said cylinders being disposed adjacent an associated one of said end walls of said casing and open ends of each of said cylinders being disposed adjacent one another, each end of said intermediate piston being disposed in a slidably sealed relation in said open end portion of an associated one of said cylinders, each of said inlet chambers being defined by an associated end of said intermediate piston and an inner surface of an associated one of said collars, each of said outlet chambers being defined by an outer surface of an associated one of said collars and an associated end wall of said casing, and said spring device is disposed coaxially outside said intermediate piston.

9. A control unit according to claim 8, wherein said casing is constructed in two parts, and
said intermediate piston is constructed in two parts, the two parts of said casing and the two parts of said piston being in abutment in a common plane.

10. A control unit according to claim 9, wherein each part of said intermediate piston has a collar on an end thereof adjacent one another, said collars abutting one another in said common plane, and
said spring device includes two springs, one of said two springs having its ends bearing against one of said collars and an end of an adjacent one of said two differential pistons and the other of said two springs having its ends bearing against the other of said collars and an end of an adjacent one of said two differential pistons.

11. A control unit according to claim 8, wherein said intermediate piston includes a collar centrally located thereon between said two differential pistons, and
said spring device includes two springs, one of said two springs having its ends bearing against an end of one of said two differential pistons and an adjacent surface of said collar and the other of said two springs having its ends bearing against an end of the other of said two differential pistons and an adjacent surface of said collar.

12. A control unit according to claim 8, further including
a ring disposed in said casing between and spaced from said two differential pistons, said ring having ends thereof providing stops defining said maximum displacement travel of both of said differential pistons.

13. A control unit according to claim 12, wherein each of said valve devices includes a valve seat formed on an associated one of said collars, a closure member disposed on an adjacent end of said intermediate piston and a spring disposed between said adjacent end of said intermediate piston and said closure member to bias said closure member against a stop.

14. A control unit according to claim 13, wherein each of said closure members is disposed on a rod projecting from said adjacent end of said intermediate piston in an axially slidably sealed relationship therewith and each of said stops in a ring disposed adjacent an end of said rod remote from said adjacent end of said intermediate piston.

15. A control unit according to claim 13, wherein each of said closure members includes a conical member having a tappet bearing against an adjacent end wall of said casing, said conical member being disposed in a sleeve fastened to said adjacent end of said intermediate piston, said sleeve having radially inwardly extending projections providing said stop.

16. A control unit according to claim 11, wherein each of said valve devices includes a valve seat formed on an associated one of said collars, a closure member disposed on an adjacent end of said intermediate piston and a spring disposed between said adjacent end of said intermediate piston and said closure member to bias said closure member against a stop.

17. A control unit according to claim 16, wherein each of said closure members is disposed on a rod projecting from said adjacent end of said intermediate piston in an axially slidably sealed relationship therewith and each of said stops in a ring disposed adjacent an end of said rod remote from said adjacent end of said intermediate piston.

18. A control unit according to claim 16, wherein each of said closure members includes a conical member having a tappet bearing against an adjacent end wall of said casing, said conical member being disposed in a sleeve fastened to said adjacent end of said intermediate piston, said sleeve having radially inwardly extending projections providing said stop.

19. A control unit according to claim 10, wherein each of said valve devices includes a valve seat formed on an associated one of said collars, a closure member disposed on an adjacent end of said intermediate piston and a spring disposed between said adjacent end of said intermediate piston and said closure member to bias said closure member against a stop.

20. A control unit according to claim 19, wherein each of said closure members is disposed on a rod projecting from said adjacent end of said intermediate piston in an axially slidably sealed relationship therewith and each of said stops in a ring disposed adjacent an end of said rod remote from said adjacent end of said intermediate piston.

21. A control unit according to claim 19, wherein each of said closure members includes a conical member having a tappet bearing against an adjacent end wall of said casing, said conical member being disposed in a sleeve fastened to said adjacent end of said intermediate piston, said sleeve having radially inwardly extending projections providing said stop.

22. A control unit according to claim 8, wherein each of said valve devices includes a valve seat formed on an associated one of said collars, a closure member disposed on an adjacent end of said intermediate piston and a spring disposed between said adjacent end of said intermediate piston and said closure member to bias said closure member against a stop.

23. A control unit according to claim 22, wherein each of said closure members is disposed on a rod projecting from said adjacent end of said intermediate piston in an axially slidably sealed relationship therewith and each of said stops in a ring disposed adjacent an end of said rod remote from said adjacent end of said intermediate piston.

24. A control unit according to claim 22, wherein each of said closure members includes a conical member having a tappet bearing against an adjacent end wall of said casing, said conical member being disposed in a sleeve fastened to said adjacent end of said intermediate piston, said sleeve having radially inwardly extending projections providing said stop.

25. A control unit according to claim 5, wherein each of said two differential pistons have a T-shaped configuration with a larger diameter portion and a smaller diameter portion,
said intermediate piston is a hollow cylinder receiving and guiding said smaller diameter portions of said two differential pistons in opposite ends thereof, and
said one helical spring is disposed within said hollow cylinder acting on said smaller diameter portions of said two differential pistons.

26. A control unit according to claim 25, wherein each of said valve devices includes a sealing cup as a valve seat disposed in a step between said large diameter portion and said smaller diameter portion of an associated one of said two differential pistons and a valve closure member provided by an adjacent end of said intermediate piston, each of said sealing cups having a sealing lip extending inwardly toward each other and abutting a bore wall of said casing.

27. A control unit according to claim 4, wherein each of said two differential pistons have a T-shaped configuration with a larger diameter portion and a smaller diameter portion,
said intermediate piston is a hollow cylinder receiving and guiding said smaller diameter portions of said two differential pistons in opposite ends thereof, and
said spring device is disposed within said hollow cylinder acting on said smaller diameter portions of said two differential pistons.

28. A control unit according to claim 27, wherein each of said valve devices includes a sealing cup as a valve seat disposed in a step between said large diameter portion and said smaller diameter portion of an associated one of said two differential pistons and a valve closure member provided by an adjacent end of said intermediate piston, each of said sealing cups having a sealing lip extending inwardly toward each other and abutting a bore wall of said casing.

29. A control unit according to claim 28, further including
a brake circuit failure alarm device actuating probe associated with said intermediate piston.

30. A control unit according to claim 27, further including
a brake circuit failure alarm device actuating probe associated with said intermediate piston.

31. A control unit according to claim 26, further including
a brake circuit failure alarm device actuating probe associated with said intermediate piston.

32. A control unit according to claim 25, further including
a brake circuit failure alarm device actuating probe associated with said intermediate piston.

33. A control unit according to claim 4, further including
a brake circuit failure alarm device actuating probe associated with said intermediate piston.

34. A control unit according to claim 1, further including
a brake circuit failure alarm device actuating probe associated with said intermediate piston.

* * * * *